Patented Sept. 29, 1942

2,297,630

UNITED STATES PATENT OFFICE 2,297,630

SLOW-ACTING MONOCALCIUM PHOSPHATE AND PROCESS OF MANUFACTURING THE SAME

Charles H. Milligan, Westfield, N. J., assignor to The American Agricultural Chemical Company, New York, N. Y., a corporation of Delaware No Drawing. Application December 4, 1940, Serial No. 368,503

7 Claims. (Cl. 99—95)

This invention relates to the manufacture of an improved, slow-acting and substantially tasteless, coated monocalcium phosphate; and, more particularly, to a new and improved process for the manufacture thereof in crystalline and substantially tasteless form, suitable for use in baking powder and for other food leavening purposes, and to the resulting product. This application is a continuation in part of my copending United States application Serial No. 325,550, filed March 23, 1940, for "Process of manufacturing slow-acting monocalcium phosphate."

In my United States Patent No. 2,121,208, granted June 21, 1938, for "Production of monocalcium phosphate," I described the production of monocalcium phosphate having a high degree of purity and suitable for use in food products, the product being in the form of clear transparent crystals of substantially uniform size, and suitable for use in baking powder or other food products. In the United States patents to Knox No. 1,943,919 and to Adler et al. No. 1,785,473, there are suggested certain ways of improving the purely mechanical properties of monocalcium phosphate materials.

In United States Patents No. 2,160,700 to Knox and No. 2,160,232 to Schlaeger, it is suggested that if concentrated phosphoric acid ($H_3PO_4$) of about 75% concentration (about 54° Bé.) is maintained at a temperature between about 165° and 170° C. while stirred with the addition of powdered quick lime (CaO) and later hydrated lime ($Ca(OH)_2$) a practically dry mass of monocalcium phosphate is produced and is found to have a relatively slow rate of reaction. In the latter patent, No. 2,160,232, it is further suggested that the rate of reaction can be still further reduced by subjecting the material to heat treatment when it contains small amounts of the oxides of sodium or potassium, either contained in or added to the phosphoric acid used in making the monocalcium phosphate. This reduced reaction rate is attributed by Schlaeger to the fact that a coating is produced upon the monocalcium phosphate particles by the heat treatment, and this he believes to be a thin autogenous coating containing a small percentage of sodium or potassium pyrophosphate and formed by inclusion of an alkali-metal metaphosphate, possible in combination with some calcium compound. This is believed to be aided by the presence of sodium or potassium oxide ($Na_2O$ or $K_2O$) in the raw material.

In both the Schlaeger Patent No. 2,160,232 and the Knox Patent 2,160,700 it is emphasized that the presence of excessive amounts of sodium or potassium pyrophosphate produce an undesirable "pyro flavor." To avoid this effect, both Knox and Schlaeger attempt to limit the amount of pyrophosphate which is formed in their disclosed processes, endeavoring to keep it less than 10%, and preferably below 5% or even below 3%, in order to attain their objects and avoid the undesired "pyro flavor."

The present invention is an improvement over all of the foregoing prior art patents and processes, and comprises both a method of producing an improved slow-acting monocalcium phosphate, and the resulting novel and useful product. The product is characterized by the fact that it can be made slower-acting than has heretofore been possible, and that it is substantially tasteless and free from undesired "pyro flavor," and is without limitation as to the permissible amount of pyrophosphate present. This is at present believed to be due to the fact that the relatively insoluble coating which imparts the slow-acting properties to my improved product consists substantially of, or, at least, comprises as its principal effective ingredient, relatively insoluble and tasteless magnesium pyrophosphate, as distinguished from the more soluble and objectionable-tasting sodium or potassium pyrophosphates suggested in the prior art.

Objects of the present invention are to produce, by my improved method, an improved, crystalline, slow-acting, coated, and substantially tasteless monocalcium phosphate of high purity, and suitable for food purposes, more particularly for use in baking powder and for other food leavening purposes. My improved product may be produced in the form of fine, practically dry or anhydrous crystalline particles, which are free flowing and have a low or negligible content of free phosphoric acid, and, after the heat-treatment hereafter described, can be cooled and finished in the ordinary way to yield a fine, pure, crystalline product, believed to be coated with a relatively insoluble coating, which is slow-acting when used in baking powder or other food leavening mixtures, and which gives improved results in baking, because of its slower-acting properties. Moreover, the relatively insoluble coating of my novel product, as developed by the heat treatment thereof, may contain large amounts of pyrophosphate, believed to comprise substantially or effectively magnesium pyrophosphate, without producing the undesired "pyro flavor," and while remaining substantially tasteless.

The foregoing and other objects are obtained, according to my discovery, by the addition of a small quantity of ammonia, or its salts, such as ammonium carbonate or ammonium phosphate, to the phosphoric acid, before or simultaneously with the addition of the lime or other calcium salt, such as calcium carbonate, or simultaneously with the addition of the magnesia as hereafter described, in order to provide a small quantity of ammonium phosphate (as by reaction of the ammonium carbonate with the phosphoric acid) in the material to be treated; and, further, before the neutralization is finally completed, by the addition of a small quantity of magnesia (MgO), instead of completing the neutralization with a calcium compound such as quick or hydrated lime or calcium carbonate. By these means, after the heat treatment hereafter illustrated, I obtain improved and substantially tasteless, coated particles of monocalcium phosphate which have, commercially, highly satisfactory slow-acting properties, and which have been found suitable for use in the manufacture of baking powders, self-rising flours, or other leavening mixtures.

It is found that when a considerable portion of the quick lime has been added to the phosphoric acid, the lime reacts with a portion of the acid to form monocalcium phosphate which immediately crystallizes because it is relatively insoluble in strong, hot phosphoric acid. Successive additions of lime produce monocalcium phosphate crystals which precipitate as before, any excess water being evaporated.

Before all the phosphoric acid has reacted by combining with the added lime, whether quick or hydrated, or other calcium salt such as calcium carbonate, I stop adding calcium salts and substantially complete the neutralization by the addition of solid magnesia until a substantially dry mass of crystalline monocalcium phosphate is produced. The necessary ammonium salt may be added at this stage, as in the form of the carbonate, simultaneously with the magnesia, or may have been added earlier, as already described. If the product, after addition of the required amount of magnesia, as illustrated below, is not fully neutralized, additional lime, preferably hydrated, or other neutralizing agent, may be added until a negligible amount of free acid remains.

Thus the neutralization may be completed by addition of calcium carbonate; or by addition of a small amount of tricalcium phosphate, which has the further effect of rendering the product free flowing.

The ammonia or ammonium salt present in or added to the original phosphoric acid may suitably be of the order of about 1% or less of the acid at the commencement of the reaction, but should in general be sufficient to amount to at least about 0.25% of ammonia in the final product, although the ammonia is believed to be, to a considerable extent, volatilized from the final coating during the heat treatment. The ammonium compound may be added either at the commencement of the reaction, or simultaneously with addition of the magnesia.

The addition of magnesia may amount to 0.5% or more, and, preferably, amounts to the order of upwards of about 1.0%, so that, upon analysis of the final product, the magnesia will be found in excess of about 1%; and it has been found best, as at present advised, between about 2.0% and 3.0%. The pyrophosphate, believed to be a principal effective ingredient of the coating, may be, for best results, in excess of about 10% of the product. The magnesia is determined as MgO by analysis, and the pyrophosphate as $P_2O_5$ by analysis, and may be expressed as so determined.

A suitable apparatus for carrying out my process comprises a steam jacketed glass-lined kettle provided with a steam inlet and an outlet for the condensate. The lime (at first quick and later hydrated), or other suitable calcium salt, and the magnesia, may be added through a suitable feeder and the concentrated phosphoric acid may be added through a pipe. A rotary or other suitable agitator, for use in stirring the mass during reaction, is preferably used throughout.

The subsequent heat treatment for development of the coating may be carried out in known manner, at temperatures generally above about 140° C. and preferably between about 160°–180° C., and for periods varying from less than half an hour up to about six hours. The time and temperature are preferably so correlated as to develop a pyrophosphate content (determined as $P_2O_5$) at least equivalent to the magnesia content (determined as MgO).

SPECIFIC EXAMPLES

Illustrative examples according to my invention are as follows:

*Example 1*

About 27 pounds of concentrated phosphoric acid, $H_3PO_4$, of about 75% concentration, is placed in a pot and steam is turned on while an agitator is operated in the pot. After the temperature reaches about 120° C., enough ammonium carbonate or ammonium phosphate is added to yield at least about 0.25% ammonia in the final product. This amounts to approximately 1% of ammonium carbonate, or approximately 2% of ammonium phosphate, calculated on the original 27 pounds of phosphoric acid. Quick lime (CaO) is then dusted into the pot through a screen, a little at a time, until about 5 pounds has been added. This operation is carried out carefully, in order to avoid boiling over of the hot phosphoric acid due to the heat of reaction, and the lime must be allowed to react after each successive addition.

After addition of approximately the above-stated quantity of quick lime, the neutralization is continued almost to completion (as indicated by the fact that the reaction mass appears almost dry), by addition of hydrated lime ($Ca(OH)_2$).

Before the mixture is completely dry, addition of the hydrated lime is stopped and about 0.5%, or more, of magnesia (MgO) is added in the form of a fine powder.

If the mixture still contains free phosphoric acid after addition of this quantity of magnesia, addition of hydrated lime or other calcium salt is resumed until the resulting product is dry and contains substantially no free phosphoric acid by chemical test, or, at least, has an acidity of less than about 0.5%.

After all the lime and the magnesia have been added and the product is completely dry, agitation of the mass is continued for about 25 to 30 minutes longer, at a temperature above about 140° C., and preferably between about 160° and 180° C. It is believed that, by this treatment, the coating upon the particles is developed in order to impart the desired slow-acting properties to the resulting product.

If, after cooling, it is found that any small amount of free phosphoric acid still persists in the cooled crystals, this can be corrected by the addition of a small amount of hydrated lime, calicum carbonate or tricalcium phosphate, which latter also promotes free flowing of the product. The cooled crystals are then sent to the usual screens, separated or finished to the desired size, and are then ready for use.

Example 2

An example of what is, at present, a preferred method of carrying out my process, to produce my novel product, is as follows:

About 26 pounds of concentrated phosphoric acid (75% H₃PO₄) was placed in a glass lined, agitated kettle and heated to about 120° C. Approximately 6.25 pounds of quick lime was then added to the acid in fairly large amounts, waiting until each addition was completely dissolved before the next addition. When the monocalcium phosphate began to precipitate the lime was added more slowly and time allowed for the reaction to be completed after each addition.

When the product formed into a balled-up mass, half a pound of additional lime was rapidly added. One tenth of a pound of calcium carbonate was then added. The monocalcium phosphate so formed was then treated with one half a pound of ammonium carbonate and one half pound of magnesia (MgO). The addition of the ammonium carbonate-magnesia mixture was slow and uniform. Towards the end of the reaction a small amount (less than one tenth of a pound) of tricalcium phosphate was also added, to make the product free flowing.

At this point the product consisted of fine, free flowing crystals, with an acidity of less than 0.5%. In order to convert the material to a slow acting product, by developing the coating, it was next heated for approximately six hours at about 180° C.

An analysis of the resulting product, together with certain physical determinations made upon it, was as follows:

| | |
|---|---|
| Total phosphate (per cent P₂O₅) | 61.60 |
| Free acid (per cent P₂O₅) | 0.01 |
| Pyrophosphate (per cent P₂O₅) | 10.00 |
| Magnesia (per cent MgO) | 2.70 |
| Ammonia (per cent NH₃)) | 0.34 |
| Neutralizing value | 80.30 |
| Cubic centimeters gas evolved (1 minute) | 7 |
| Cubic centimeters gas evolved (7 minutes) | 44.50 |
| Dough weight (in grams—7 biscuits) | 198 |
| Volume in cubic centimeters (7 biscuits) | 500 |
| Crumb color | White |
| Taste | Good |

It will be observed that this product contained magnesia (determined as per cent MgO in the final product) amounting to 2.70%, and pyrophosphate (determined as per cent P₂O₅ in the final product) amounting to 10%; yet it was found to be substantially tasteless, and free from all objectionable "pyro flavor."

While I do not know all the reactions which take place during the process as described, it is my present belief that the described treatment, in which the neutralization is partially effected by use of magnesia reacting upon the phosphoric acid containing a small quantity of combined ammonia (e. g., ammonium phosphate) as described, results in the production, before the described heat treatment following completion of the reaction, of a coating comprising magnesium-ammonium phosphate, upon the crystals. By the described heat treatment, (as from 25 to 30 minutes up to several hours) at a temperature above about 140° C., and preferably between about 160° and 180° C., it is believed that this coating is converted to one containing a substantial amount of, or comprising as an essential or predominating effective ingredient, magnesium pyrophosphate; and that the ammonia is, to a substantial extent at least, driven off by the heat. It is believed also that such a coating, comprising substantially or essentially magnesium pyrophosphate, is, relatively, considerably less soluble than prior coatings comprising largely sodium, potassium or calcium pyrophosphates; and that the fact that the ammonia is to a considerable extent volatilized from the final coating may contribute to the slow-acting properties of the final product. Because of the relative insolubility and tasteless character of the magnesium pyrophosphate, a much thicker coating can be employed without producing any undesirable taste or flavor. My present belief, also, is that the greater slowness of my improved product is due to this increased thickness of the relatively insoluble coating which may be used, in my product, because of the essentially tasteless character, and greater insolubility, of the magnesium pyrophosphate which forms, I believe, a principal effective ingredient of my coating.

The foregoing theoretical explanation is not, however, in any sense a part of my invention; and I wish it to be clearly understood that I am not bound by the theory suggested, or its correctness, since the product may be produced by the chemical operations which I have described and illustrated, entirely irrespective of any theoretical considerations.

The phrase "a small quantity of ammonia" or similar expression, used in the appended claims, is intended to include also ammonium salts, such as ammonium carbonate or ammonium phosphate, as described above.

The method and product herein described, and the illustrative examples given, comprise the best embodiments of my invention now known to me; but it is to be understood that the invention is not necessarily or specifically limited thereto, but may be carried out in other ways, without departure from its spirit, within the scope of the following claims.

I claim:

1. In a process of manufacturing an improved, slow-acting, crystalline and substantially tasteless, coated monocalcium phosphate product, comprising heating concentrated phosphoric acid and partially neutralizing the same with a calcium compound to form a substantially dry, crystalline product, and thereafter subjecting the same to heat treatment at a temperature above about 140° C. to develop a relatively insoluble coating thereon: the improvements which comprise stopping the addition of calcium compound prior to completion of the neutralization and continuing the neutralization by addition of at least about 0.5% magnesia and an ammonium salt free from harmful quantities of sodium and potassium impurities; after which the product is subjected to said heat treatment at an elevated temperature to develop thereon a substantially insoluble and tasteless coating comprising, as an effective ingredient, a substantial amount of magnesium pyrophosphate.

2. As a new article of manufacture: finely divided, crystalline, substantially anhydrous, slow-acting monocalcium phosphate of which each particle is provided with a substantially complete, relatively insoluble and substantially tasteless coating upon the outer surface thereof, said coating having, as its principal effective ingredient, magnesium pyrophosphate, substantially concentrated upon the surface of the product and having a content of sodium and potassium below an amount which imparts objectionable pyro taste to the product.

3. As a new article of manufacture: finely divided, substantially anhydrous, slow-acting monocalcium phosphate crystal particles, each provided with a substantially complete, relatively insoluble and substantially tasteless coating upon the outer surface thereof, said coating having, as its principal effective ingredients, magnesia and pyrophosphate; said magnesia being present in the amount of between about 2.0% and 3.0% of the entire product, when determined as MgO by analysis; and the total pyrophosphate being substantially concentrated in the coating of the product and present in an amount equal to at least about 10% of the entire product, when determined as $P_2O_5$ by analysis, said product having a content of combined sodium and potassium less than an amount which imparts objectionable pyro taste to the product.

4. In a process of producing leavening agents for food products comprising improved, coated, slow-acting monocalcium phosphate crystals, which process comprises the steps of heating concentrated phosphoric acid to a temperature above about 120° C., and high enough to dry out excess water contained therein, and, while maintaining said phosphoric acid at such temperature, gradually adding a basic calcium compound, a little at a time, with agitation, until the phosphoric acid has been substantially neutralized to produce a substantially dry mass of monocalcium phosphate crystals: the improvements which comprise adding a substantial quantity of magnesia, amounting to in excess of about 0.5%, prior to substantially complete neutralization, in the presence of a small quantity of ammonia and in the absence of harmful quantities of sodium and potassium salts, said ammonia being present in at least an amount chemically equivalent to a quantity of magnesia amounting to about 0.5%; after which the mixture is agitated and maintained at a temperature above about 140° C. until a relatively insoluble coating is developed upon the crystals, to produce an improved slow-acting and substantially tasteless product.

5. In a process of manufacturing improved leavening agents for food products, comprising slow-acting, substantially tasteless, coated monocalcium phosphate crystals, which process comprises heating concentrated phosphoric acid and neutralizing the same with a calcium compound to form a dry mass and thereafter subjecting the neutralized product to heat treatment at a temperature in excess of about 140° C. to develop a relatively insoluble coating thereon: the improvements which comprise providing a small quantity of ammonia in the concentrated phosphoric acid to provide combined ammonia therein, in an amount at least chemically equivalent to a quantity of magnesia amounting to about 0.5% of the final product, before completion of the neutralization, while minimizing the presence of harmful sodium and potassium salts; and, also before completion of the neutralization, adding to the product an effective quantity of magnesia, amounting to in excess of about 1% of the final product, prior to the final heat treatment thereof; and there after subjecting the product to heat treatment to produce reaction of said magnesia in the presence of ammonium salt and to produce upon the product a coating comprising a substantial amount of magnesium pyrophosphate.

6. In a process of producing improved leavening agents for food products, comprising slow-acting monocalcium phosphate crystals, the improvements which comprise the steps of heating concentrated phosphoric acid containing a small quantity of ammonium phosphate, and free from substantial quantities of sodium and potassium impurities, to a temperature above about 120° C., and high enough to dry out excess water contained therein, and while maintaining said phosphoric acid at such temperature, gradually adding a basic calcium compound, a little at a time, with agitation, until the phosphoric acid has been substantially neutralized to produce a substantially dry mass of monocalcium phosphate crystals; then adding a quantity of magnesia amounting to at least approximately 0.5% of the entire product, and completing the neutralization; said ammonium phosphate containing ammonia in at least an amount chemically equivalent to a quantity of magnesia amounting to approximately 0.5%; after which the mixture is agitated and maintained at a temperature above about 140° C. until a relatively insoluble coating including a substantial quantity of magnesium pyrophosphate is developed upon the crystals, to produce a slow-acting product.

7. In a process of manufacturing improved leavening agents for food products, comprising slow-acting monocalcium phosphate crystals, comprising heating concentrated phosphoric acid and neutralizing the same with lime to form a dry mass and thereafter subjecting the neutralized product to heat treatment at a temperaure in excess of about 140° C. to develop a relatively insoluble coating thereon, the improvements which comprise providing a small quantity of ammonia, free from substantial quantities of sodium and potassium impurities, in the concentrated phosphoric acid before commencement of the neutralization, said ammonia being provided in an amount at least chemically equivalent to a quantity of magnesia amounting to approximately 0.5% of the entire product; and, before completion of the neutralization, adding to the product a quantity of magnesia, amounting to in excess of approximately 0.5% of the entire product, prior to the final heat treatment thereof, and thereafter heat treating the material to cause reaction of said magnesia in the presence of ammonium salt and to develop a relatively insoluble coating comprising a substantial quantity of magnesium pyrophosphate.

CHARLES H. MILLIGAN.